US012785019B2

(12) United States Patent
Jargans et al.

(10) Patent No.: US 12,785,019 B2
(45) Date of Patent: Nov. 3, 2026

(54) COMPONENT FOR HIGH-VOLTAGE SYSTEM OF A VEHICLE

(71) Applicant: VOLVO TRUCK CORPORATION, Gothenburg (SE)

(72) Inventors: Ringolds Jargans, Trollhättan (SE); Diego Santos Pereira Netto, Askim (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 433 days.

(21) Appl. No.: 18/524,735

(22) Filed: Nov. 30, 2023

(65) Prior Publication Data

US 2024/0203677 A1 Jun. 20, 2024

(30) Foreign Application Priority Data

Dec. 19, 2022 (EP) .................................... 22214593

(51) Int. Cl.
*H01H 50/54* (2006.01)
*H01H 50/02* (2006.01)
(Continued)

(52) U.S. Cl.
CPC ........ *H01H 50/546* (2013.01); *H01H 50/023* (2013.01); *H01H 89/00* (2013.01); *H01R 13/5219* (2013.01); *H01R 13/623* (2013.01); *H01R 13/70* (2013.01); *H01R 31/08* (2013.01); *H01H 51/29* (2013.01)

(58) Field of Classification Search
None
See application file for complete search history.

(56) References Cited

U.S. PATENT DOCUMENTS

| | | | | |
|---|---|---|---|---|
| 3,200,222 A | 8/1965 | Hawkins | | |
| 2018/0096811 A1* | 4/2018 | Lee | ...................... | H01H 50/026 |

(Continued)

FOREIGN PATENT DOCUMENTS

| | | |
|---|---|---|
| CN | 112992609 A | 6/2021 |
| CN | 114274776 A | 4/2022 |
| GB | 939603 A | 10/1963 |

OTHER PUBLICATIONS

Extended European Search Report in corresponding European Application No. 22214593.0 dated May 22, 2023 (6 pages).

*Primary Examiner* — Bernard Rojas
(74) *Attorney, Agent, or Firm* — Jeffri A. Kaminski; Venable LLP

(57) ABSTRACT

A component for a high-voltage electric system of a vehicle includes a hollow body having a circular cross section; a first contact arranged circumferentially in the body and configured to be externally exposed and to reach an interior of the body; a second contact arranged circumferentially in the body and configured to be externally exposed and to reach an interior of the body, the second contact separated from the first contact in the axial direction of the body; an axially movable connector element arranged within the body; and an electromagnetic relay to control axial movement of the connector element. The relay is configured so that actuation of the relay results in an axial movement of the connector element to form an electrical connection between the first contact and the second contact.

18 Claims, 6 Drawing Sheets

(51) Int. Cl.

| | |
|---|---|
| ***H01H 51/29*** | (2006.01) |
| ***H01H 89/00*** | (2006.01) |
| ***H01R 13/52*** | (2006.01) |
| ***H01R 13/623*** | (2006.01) |
| ***H01R 13/70*** | (2006.01) |
| ***H01R 31/08*** | (2006.01) |

(56) References Cited

U.S. PATENT DOCUMENTS

| | | | | |
|---|---|---|---|---|
| 2022/0200214 | A1 | 6/2022 | Roemelsberger et al. | |
| 2023/0090245 | A1* | 3/2023 | Zhong .................. | H01H 50/546<br>335/185 |
| 2023/0178318 | A1* | 6/2023 | Zhong .................... | H01H 50/14<br>335/185 |
| 2024/0206090 | A1* | 6/2024 | Jargans ................ | H01R 13/631 |
| 2026/0051447 | A1* | 2/2026 | Jiang ...................... | H01H 50/02 |

* cited by examiner

COMPONENT FOR HIGH-VOLTAGE SYSTEM OF A VEHICLE

TECHNICAL FIELD

The disclosure relates generally to a component for a high-voltage system in a vehicle. In particular aspects, the disclosure relates to a component comprising an electrical device arranged within the component. The disclosure can be applied in heavy-duty vehicles having a high-voltage system, such as trucks, buses, and construction equipment. Although the disclosure may be described with respect to a particular vehicle, the disclosure is not restricted to any particular vehicle.

BACKGROUND

With the increasing use of electric and hybrid propulsion systems in heavy vehicle, it also becomes increasingly important to provide high-voltage systems which are reliable and easily serviceable. In particular, components which are subjected to wear, and which may require replacement are advantageously easily replaceable in the vehicle. Preferably, it should be possible to remove and replace components in a high-voltage system such as contactors, fuses and pre-charge components within a matter of minutes and without having to take the vehicle to a workshop. Accordingly, it is desirable to provide improved components for high-voltage systems which facilitate fast and easy replacement.

SUMMARY

According to a first aspect of the disclosure, it is provided a component for a high-voltage electric system of a vehicle, the component comprising: a hollow body having a circular cross section; a first contact arranged circumferentially in the body and configured to be externally exposed and to reach an interior of the body; a second contact arranged circumferentially in the body and configured to be externally exposed and to reach an interior of the body, the second contact area being separated from the first contact area in the axial direction of the body; an axially movable connector element arranged within the body; and an electromagnetic relay arranged to control axial movement of the connector element, wherein the relay is configured so that actuation of the relay results in an axial movement of the connector element to form an electrical connection between the first contact and the second contact.

The first aspect of the disclosure seeks to provide an improved high-voltage component for a vehicle which is both safe as well as fast and easy to replace when needed. A technical benefit may include that the described component provides a plug-n-play functionality where the component is ready to be used as soon as it is installed and that the component can easily be accessed from an outside of the high-voltage electric system. A further advantage of the described component is that no alignment is required which significantly reduces the risk of a faulty installation. It also possible to configure the component so that it can be installed and removed without using tools.

The first aspect of the disclosure also seeks to provide a connection mechanism within the component which is both secure and reliable. This can be achieved by the described relay-controlled connector element which is operable to switch between an open and a closed electrical circuit by controlling the axial position of the connector element. In particular, a safe disconnection mechanism can be provided in a high-voltage system by breaking a mechanical and electrical connection through physical movement of the connector element.

In some examples, the connector element comprises a rod, a first flange attached to the rod and arranged to form a connection with the first contact and a second flange attached to the rod and arranged to form a connection with the second contact upon actuation of the relay.

The rod and the first and second flanges are all made from an electrically conductive material. Accordingly, each of the first and second flange of the connector element form a physical and electrical connection with the respective first and second contact of the component when the relay is actuated. The rod will thereby form a conductive path between the first and second contact. A technical benefit may include that the area of contact is defined by the flange and a large surface area can be achieved which may be required in high-voltage systems operating with high currents.

In some examples, at least one of the first and second contact extends into the interior of the body. A technical benefit may include that a simplified connection mechanism is provided where a connector element can more easily form a connection with the contact within the exterior of the body. It would however also be possible to have first and second contacts which are integrated in the wall of the body and where the connection element is configured forms a connection to the respective contacts by contacting the inner sidewall of the body at the location of the contacts.

In some examples, at least one of the first and second contact comprises a central opening through which the connector element is arranged. A technical benefit may include that the rod of the connector element can then run through the opening of the contact which provides an advantageous mechanical arrangement where the opening of the first and/or second contact acts as a guide for the rod to prevent misalignment of the connector element.

In some examples, the rod comprises an insulating sheath. A technical benefit may include that the surface of the rod is protected from wear and the rod is also electrically insulated to prevent unwanted electrical connections. In examples where the rod is arranged to pass through an opening of a contact, it is particularly desirable to use an insulating sheath to prevent an electrical connection between the rod and the contact.

In some examples, the insulating sheath comprises at least one opening enabling an electrical connection to be formed to the rod. A technical benefit may include that by providing an opening in the sheath, additional electrical connections to the connecting element can be formed without having to add further flanges or the like. The location of the opening in the sheath can be arranged so that electrical contact is formed with the rod when the connecting element is in a position where there is no connection between the first and second contacts. It is also possible to form a plurality of openings in the sheath in the same manner.

In some examples, the component further comprises a third and a fourth contact each contact being arranged circumferentially in the body and configured to be externally exposed and to reach an interior of the body. The third and fourth contacts may for example be low-voltage terminals for controlling functionality of the component. A technical benefit may include additional functionality can be included in the component.

In some examples, the third and fourth contacts are connected to the electromagnetic relay to control actuation of the electromagnetic relay. A technical benefit may be that also the contacts for controlling the electromagnetic relay are integrated in the component and thereby protected.

In some examples, the electromagnetic relay is a multi-stage electromagnetic relay where the axial position of the connecting element can be controlled to be in at least two different actuated positions in addition to a rest-position when the relay is not actuated. A technical benefit may include that more complex functionality can be provided by one and the same component such as circuitry where events need to occur sequentially. An example is where the component comprises a pre-charge resistor to be engaged prior to connection of the high-voltage system as a whole, where the pre-charge resistor can be connected in a first actuation stage.

In some examples, the multi-stage electromagnetic relay comprises a first spring so that a first stage actuation of the relay requires a first actuation force and a second spring so that a second stage actuation of the relay requires a second actuation force higher than the first actuation force. A technical benefit may include that the two stages of the relay can be controlled by controlling the actuation force provided to the relay, for example by controlling pulse-width modulation (PWM) of a control signal provided to a solenoid of the electromagnetic relay.

In some examples, the component further comprises a pyro fuse configured to destructively break the connection element upon actuation of the pyro fuse. The pyro fuse can for example be controlled via the third and fourth contacts described above or separate contacts may be added specifically for controlling the pyro fuse. A technical benefit may include that when the pyro fuse is integrated in the component, controlled and safe destruction of a selected connection element can be achieved without influencing other components in the system, and the specific component where the pyro fuse has been actuated can be individually replaced.

In some examples, the component further comprises a fifth contact arranged circumferentially in the body and configured to be externally exposed and to reach an interior of the body. A technical benefit may include that the fifth contact is arranged in connection with an additional device in the component such as a pyro fuse, a pre-charge resistor or any other device integrated in the component in addition to the contactor defined by the connection element.

In some examples, the body of the component has a substantially cylindrical shape. The body thus has a circular cross-section which has substantially the same diameter over the length of the component, with the exception of an end cap which may have a larger diameter. A technical benefit may include that the component is easy to install and that the component does not require alignment when being installed. Moreover, a cylindrical shape enables the use of many commonly used fastening mechanisms for securing the component in a socket.

In some examples, the body is tapered in a direction away from the cap. The body thus has a circular cross-section which has a decreasing diameter over the length of the component in a direction away from the cap. A technical benefit may include that the component may more easily fit into a correspondingly conical socket.

In some examples, at least one of the first and second contact area is threaded and configured to be threaded into a receiving socket, thereby forming a fastening mechanism or part of a fastening mechanism of the component. A technical benefit may include that a good electrical and mechanical connection can be ensured by the threaded contact areas when the component is installed in a socket. Moreover, the threaded connection may be sufficient so that no further fastening mechanism is required, thereby simplifying the design of the component.

In some examples, the component further comprises a cap comprising a seal ring configured to form a seal against a socket. A technical benefit may include that a closed seal is formed between the component and a socket so that the contacts are fully protected from the external environment, thereby reducing the risk of corrosion and other types of degradation of the contacts. The components may preferably be located so that they are easily accessible from an outside of the vehicle which in turn may expose the components to water, dirt and the like, making a secure seal advantageous to protect the contact areas.

In some examples, there is also provided a connector assembly comprising a component according to any one of the aforementioned examples and a socket configured to receive the component. The shape and configuration of the socket would then have electrically conductive contact areas corresponding to the contact areas of the component. Moreover, the socket is connected to and forms part of the high-voltage system of the vehicle so that the component is ready to be used as soon as it is installed in the socket.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Present solutions for replaceable components in high voltage systems for example include a removable service box which encapsulates previously stated components together with several additional components in one removable package. This drives significant cost and design complexity due to additional components required to secure ease of service while maintaining degree of safety and system integrity. Moreover, such solutions may also fail to meet increased serviceability requirements where it is desirable that certain components should be replaceable without having to visit a workshop or the like.

Figure 1:
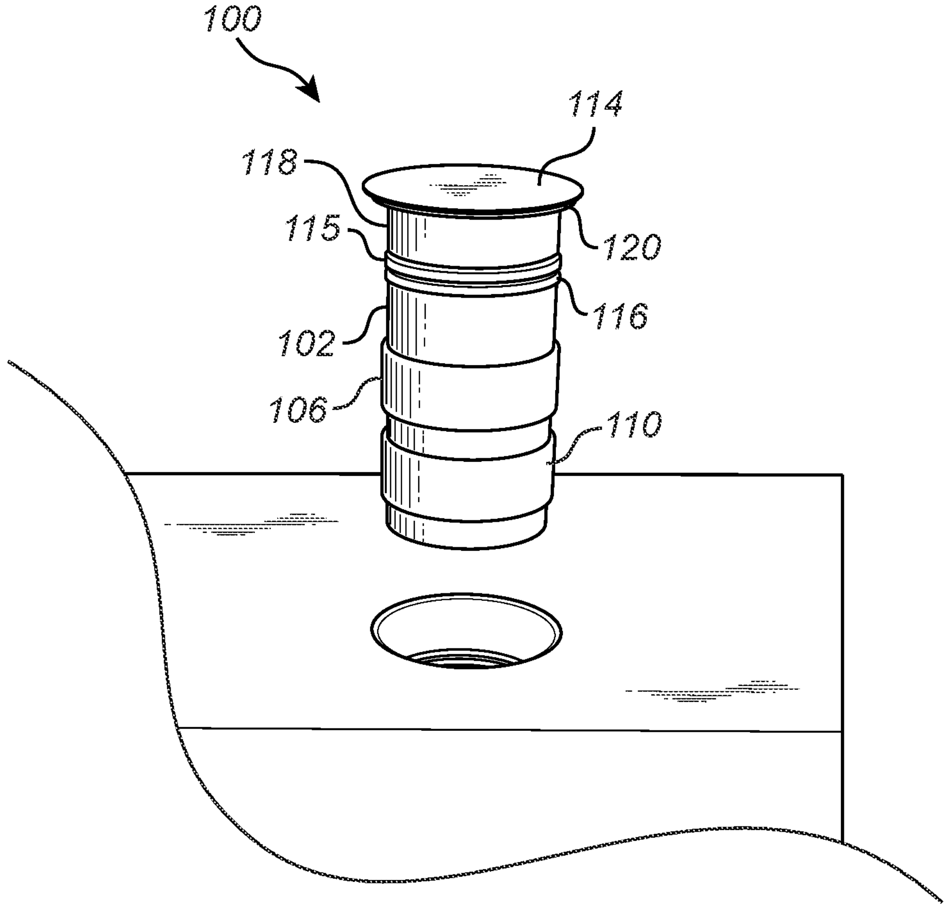
FIG. 1 is a schematic illustration of an exemplary component according to one example of the inventive concept.
Figure 2:
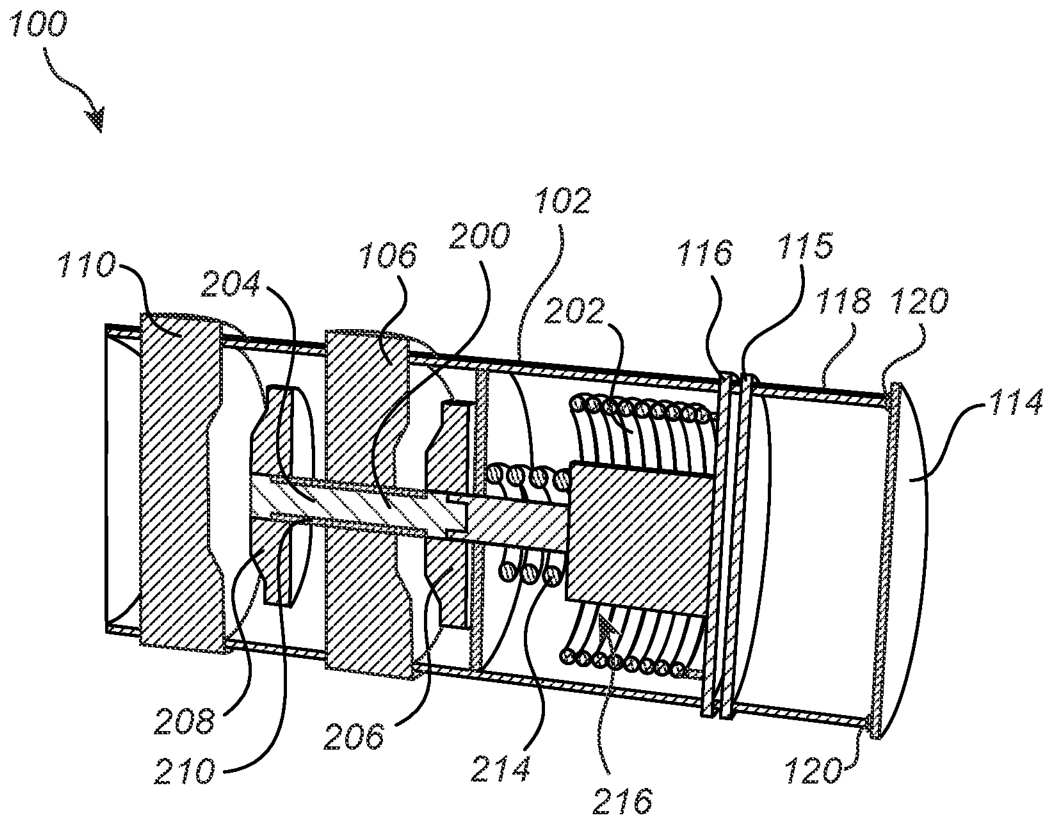
FIG. 2 is a schematic cross section view of an exemplary component according to one example of the inventive concept.

FIG. 1 is an exemplary component 100 for a high-voltage electric system of a vehicle and FIG. 2 is a cross section view of the component 100. The component comprises a hollow body 102 having a circular cross section. The body 102 is substantially cylindrical and the body 102 is made from an electrically insulating material. Moreover, the body 102 is preferably hermetically sealed and may also be gas filled, for example by an inert gas, in part to protect the elements within the body and also to reduce the risk of arcing or the like inside the component 100.

The component further comprises first and second electrically conductive contacts 106, 110 arranged circumferentially in the body 102 and configured to be externally exposed and to reach an interior of the body 102, wherein the second contact 110 is separated from the first contact 106 as seen in the axial direction of the body 102. Both the width and the separation distance of the first and second contacts 106, 110 can be selected to ensure that there is no arcing or currents between the first and second contacts 106, 110. The properties of the first and second contacts 106, 110 can thereby be based on the properties and requirements of a particular high-voltage electric system.

In the present description, the first and second contacts 106, 110 are illustrated to reach all the way around the component 100 to provide a circular contact area. However, the first and second contacts 106, 110 may equally well be sectioned and/or divided into separate area portions along the circumference of the component 100 while still providing the same technical effects and benefits as contacts reaching all the way around the component 100. The first and second contacts 106, 110 may for example be formed by metal rings, such as copper rings, to provide good electrical conductivity. Moreover, the first and second contacts 106, 110 are arranged to reach an interior of the body 102 to form an electrical connection from the outside of the component 100 to within the hollow body 102.

As illustrated in FIG. 2, the component 100 further comprises an axially movable connector element 200 arranged within the body 102, and an electromagnetic relay 202 arranged to control axial movement of the connector element 200. The relay 202 is configured so that actuation of the relay 202 results in an axial movement of the connector element 200 to form an electrical connection between the first contact 106 and the second contact 110 through the connector element 200.

As illustrated in FIG. 2, the connector element 200 comprises a rod 204, a first flange 206 attached to the rod 204 and arranged to form a connection with the first contact 106 and a second flange 208 attached to the rod 204 and arranged to form a connection with the second contact 110 upon actuation of the relay 202. In the illustrated example, the first and second flanges 206, 208 are tapered in a shape corresponding to a recess in the respective first and second contacts 106, 110 in order to ensure good mechanical and thereby electrical connection between the flange and the contact. At least the first contact 106 is thus open, i.e. ring-shaped, at a central portion of the contact and the rod 204 of the connector element 200 is arranged through the opening so that the rod 204 can move in an axial direction of the component 100. It should be noted that the exact shape of the contacts and the connector element 202 may be modified in many different ways while still providing the described functionality of the inventive concept.

Moreover, the rod 204 of the connector element 200 comprises an insulating sheath 210 which is arranged around the rod 204 to prevent an electrical contact between the rod 204 and the first contact 106 when the connector element is in a non-actuated position.

The electromagnetic relay 202 is here represented by a spring loaded connection element 202 arranged together with a solenoid 216. The spring 214 is arranged to maintain the component in a disconnected state when no voltage is applied to the solenoid. Once a sufficiently high voltage is applied to the solenoid 202, an electromagnetic force acts on the connector element 202 to overcome the spring force and to form an electric connection between the first contact 106 and the second contact 110 through the rod 204.

The illustrated component 100 further comprises a cap 114 attached to an end portion 118 of the body 102. The cap 114 is here is here represented by a circular plate at the end portion 118 of the body 102 and the cap 114 is further illustrated to comprise a seal 120 in the form of a rubber gasket or the like configured to form an environmental seal when the component 100 is arranged in a corresponding socket. In general, the seal 120 may comprise an O-ring or a washer. It should however be noted that both the end cap 114 and the seal 120 may be configured in many different ways while still providing the desired functionality.

In some examples, the component 100 further comprises third and fourth contacts 115, 116 each arranged circumferentially on the body, and configured to be externally exposed and to reach an interior of the body. The third and fourth contacts 115, 116 are for example low-voltage terminals and the third and fourth contacts 115, 116 can consequently be made smaller as illustrated in FIGS. 1-2 since they do not have to carry the same amount of current as the high-voltage contacts 106, 110. The low-voltage terminals 115, 116 may for example provide gnd and vcc terminals for control signals for actuation of the electromagnetic relay 202. The third and fourth contacts 115, 116 are thereby electrically connected to a device within the component. In the present context, a low voltage is typically in the range below 48V, such as nominal voltage values of 3.3 V, 5 V, 12 V or 24 V to be used for control signals. High-voltage in the present context refers to voltages above 48 V, and in a high-voltage electric system of a vehicle the high voltage may be the so called traction voltage with voltages in range between 500 V and 900 V. The skilled person readily realizes that the number of terminals for both high-voltage and low-voltage connections can be increased or decreased depending on the required functionality for a particular application.

Figure 3A:
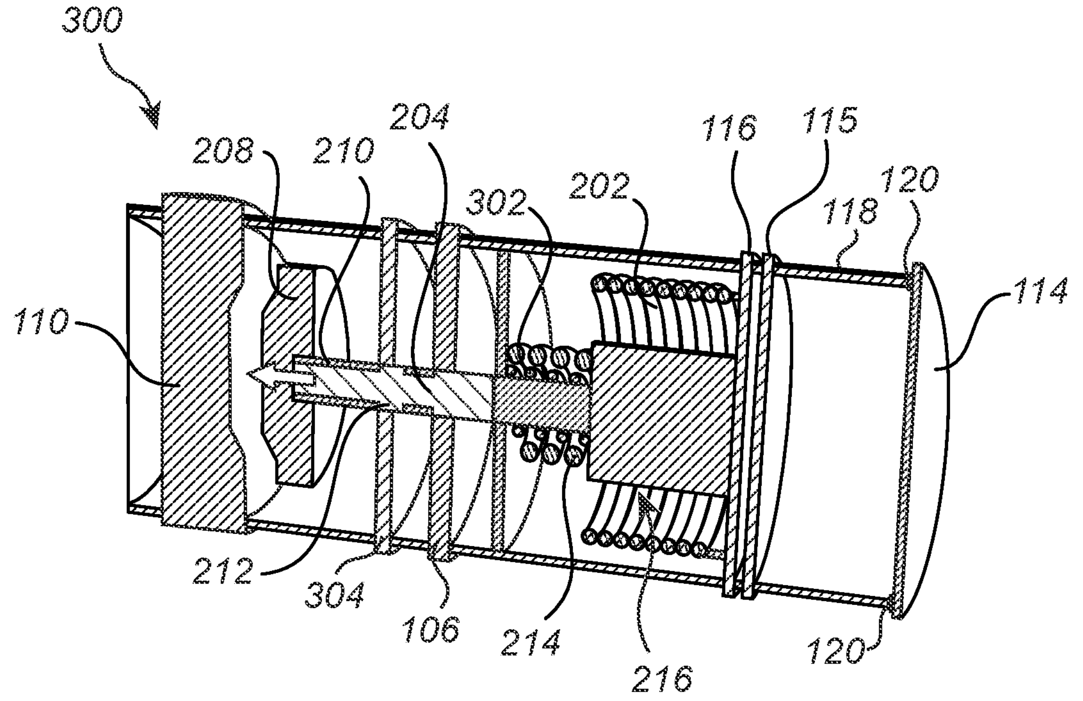
FIGS. 3A and 3B are a schematic cross section view of an exemplary component according to one example of the inventive concept.
Figure 3B:
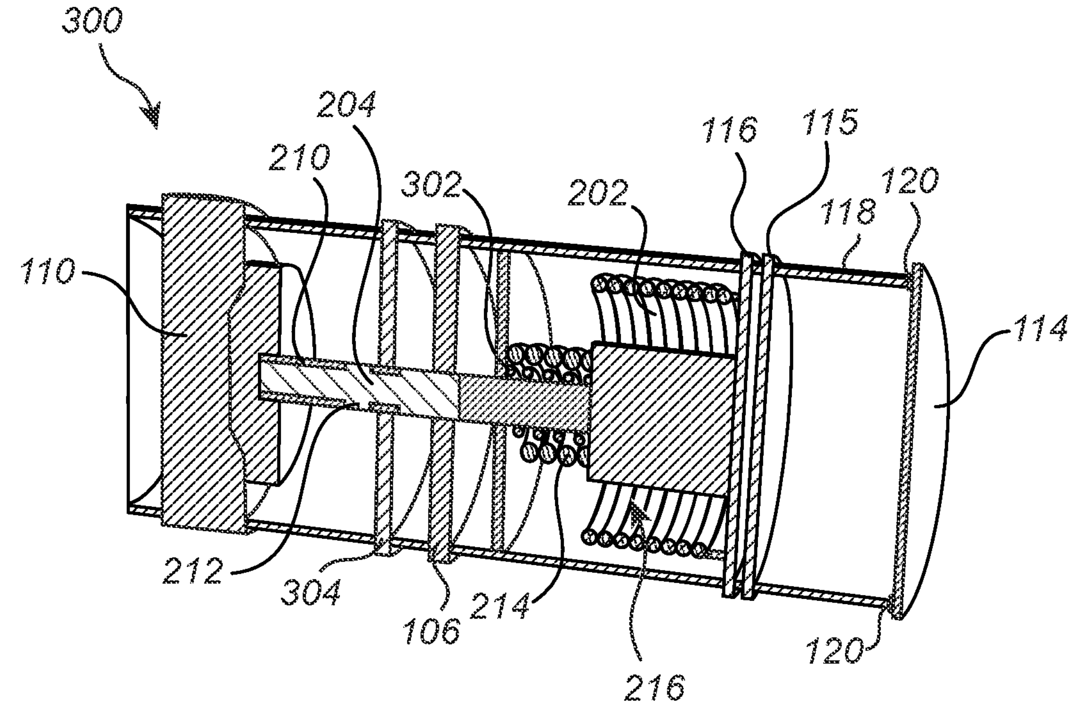

FIGS. 3A-B schematically illustrate an example where the component further comprises a fifth contact 304 arranged circumferentially in the body 102 and configured to be externally exposed and to reach an interior of the body 102. The fifth contact 304 is here arranged between the first and second contacts 106, 110 as seen in an axial direction of the cylindrical body 102 of the component 300. Moreover, the insulating sheath 210 of the rod 204 comprises an opening 212 enabling an electrical connection to be formed between the rod 204 and the fifth contact 304.

In example illustrated in FIGS. 3A-B, the electromagnetic relay is a multi-stage electromagnetic relay meaning that the relay can be controlled to actuate the connector element 200 in several distinct stages. The multi-stage electromagnetic relay 202 comprises a first spring 214 so that a first stage actuation of the relay requires a first actuation force and a second spring 302 so that a second stage actuation of the relay requires a second actuation force higher than the first actuation force.

FIG. 3A illustrates the first stage of actuation where the connector element 200 is moved in an axial direction away from the cap 114 but without forming a connection between the first and second contacts 106, 110 since the flange 208 of the connector element 200 is not in contact with the corresponding contact 110 of the component. Instead, a connection is formed between the first contact 106 and the fifth contact 304 via the rod 204 and through the opening 212 in the insulating sheath 210. The fifth contact 304 can for example be used to connect a battery to an external pre-charge resistor in a first stage of connection. In some examples, the component may be connected to another component of similar configuration which comprises the pre-charge resistor.

FIG. 3B illustrates the second stage of actuation where the connector element is fully actuated and moved in a direction away from the cap 114 so that an electrical connection is formed between the first contact 106 and the second contact 110, for example to fully connect an energy storage system of a vehicle to power consumers such as traction motors. In particular, the first contact 106 is connected directly to the rod 204 and the second contact 110 forms a contact to a flange 208 of the connector element 200. However, electrical connection between the first contact and the connector element may also be formed using a flange as illustrated in FIG. 2, and other configurations of the connector element are possible to achieve the described two stage connection.

Figure 4:
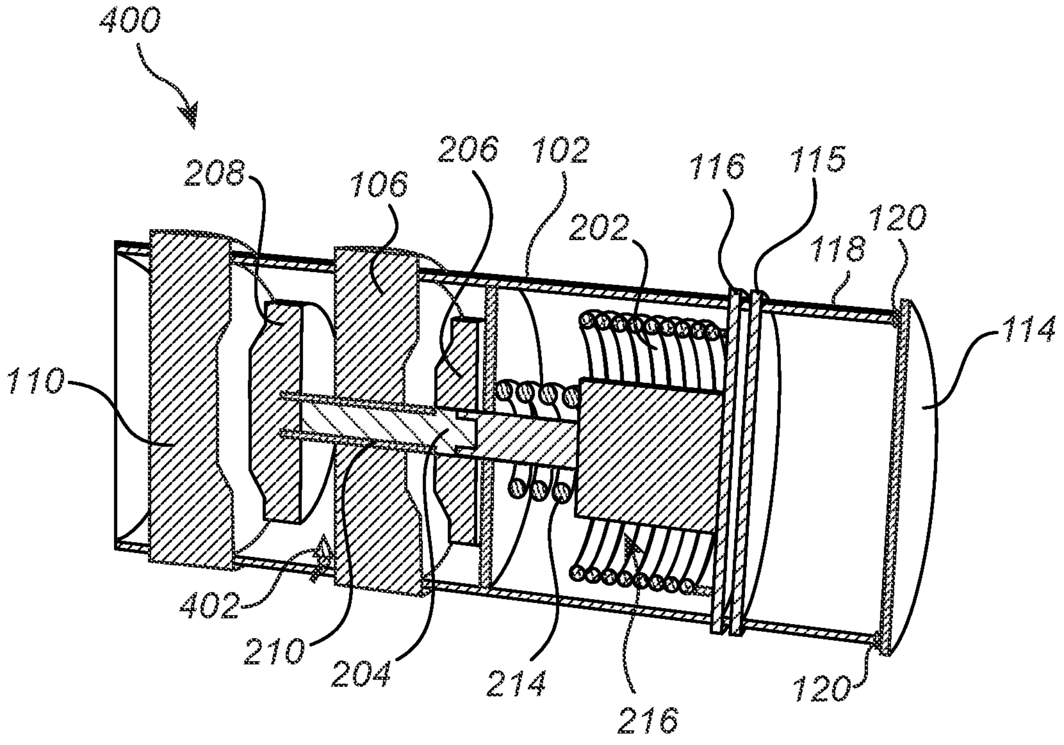
FIG. 4 is a schematic cross section view of an exemplary component according to one example of the inventive concept.

In an example illustrated in FIG. 4, the component 400 further comprises a pyro fuse 402 configured to destructively break the connection element 200 upon actuation of the pyro fuse.

The pyro fuse 402 could for example be controlled via the same PWM signal that controls the electromagnetic relay 202. For example, 100% duty cycle of PWM could be configured to blow the pyro fuse. It would also be possible to provide additional circumferentially arranged low-voltage contacts to provide a control signal for triggering the pyro fuse 402.

Figure 5:
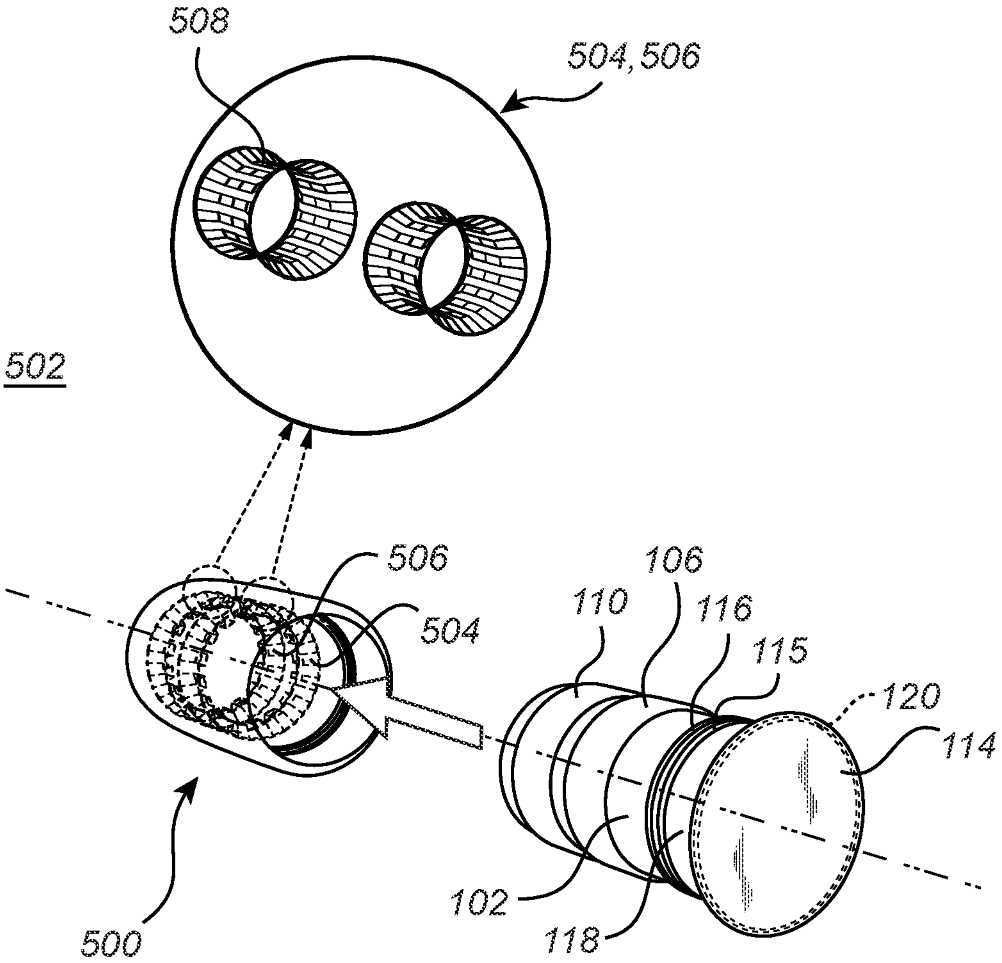
FIG. 5 is a schematic illustration of an exemplary connector assembly according to one example of the inventive concept.

FIG. 5 schematically illustrate a socket 500 configured to receive a component 100. The socket 500 and component together form a connector assembly 502. In the illustrated example, the socket 500 comprises a first electrical spring contact 504 arranged to form a contact with the first contact 106 and a second electrical spring contact 506 arranged to form a contact with the second contact 110 of the connector. The first and second electrical spring contacts 504, 506 are configured to have an inner diameter which is smaller than an outer diameter of a respective contact 106, 110 such that the central portion 508 of the spring contact 504, 506 press against the respective contact area 106, 110 when the component 100 is inserted into the socket 500, thereby forming an electrical connection between the component and the socket 500.

The socket 500 may advantageously also be configured to prevent or at least reduce the risk of insertion of foreign objects into the socket when no component is installed therein. The socket may for example comprises a seal (not shown) which both prevent insertion of foreign objects, and which protects the interior of the socket from dirt, water and the like when no component is installed.

Figure 6:
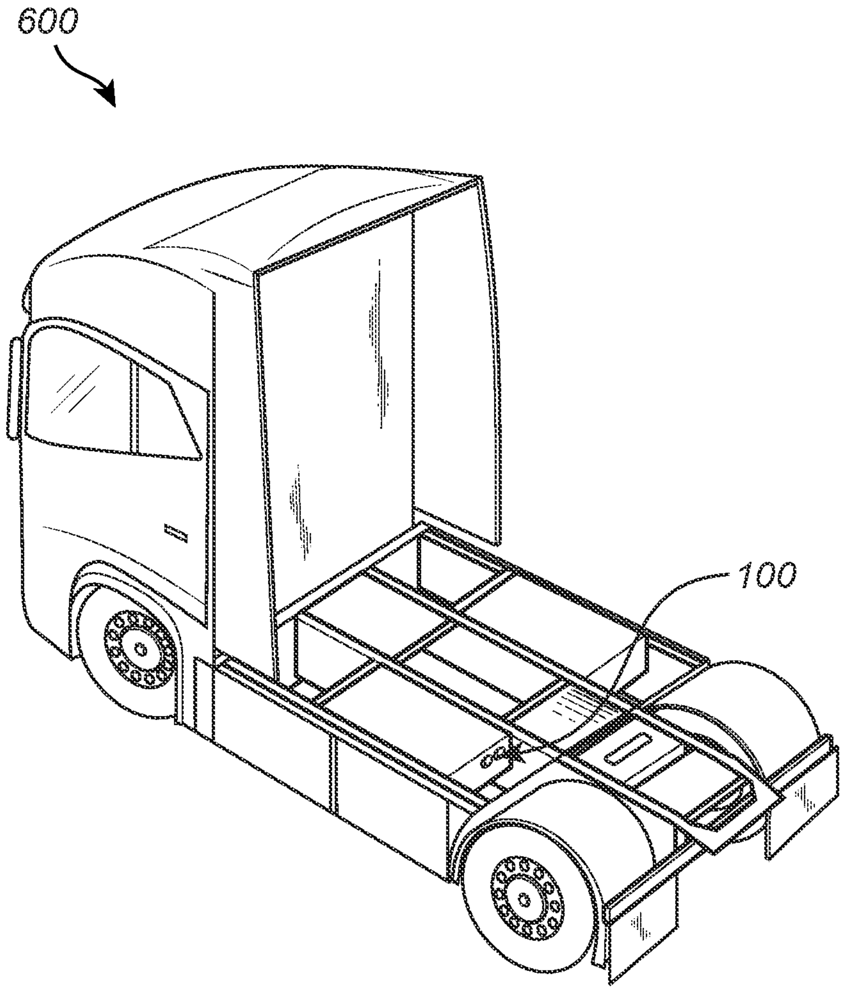
FIG. 6 is a schematic illustration of an exemplary vehicle according to one example of the inventive concept.

FIG. 6 is a schematic illustration of an exemplary vehicle 600 comprising a component 100 according to one example of the inventive concept. Here it is illustrated that the component is easily accessible for improved serviceability of the vehicle 600.

Example 1. A component (100) for a high-voltage electric system of a vehicle, the component comprising:

- a hollow body (102) having a circular cross section;
- a first contact (106) arranged circumferentially in the body and configured to be externally exposed and to reach an interior of the body;
- a second contact (110) arranged circumferentially in the body and configured to be externally exposed and to reach an interior of the body, the second contact being separated from the first contact in the axial direction of the body;
- an axially movable connector element (200) arranged within the body; and
- an electromagnetic relay (202) arranged to control axial movement of the connector element, wherein the relay is configured so that actuation of the relay results in an axial movement of the connector element to form an electrical connection between the first contact and the second contact.

Example 2. The component according to example 1, wherein the connector element comprises a rod (204), a first flange (206) attached to the rod and arranged to form a connection with the first contact and a second flange (208) attached to the rod and arranged to form a connection with the second contact upon actuation of the relay.

Example 3. The component according to example 1 or 2, wherein at least one of the first and second contact extends into the interior of the body.

Example 4. The component according to any one of the preceding examples, wherein at least one of the first and second contact comprises a central opening through which the connector element is arranged.

Example 5. The component according to any one of examples 2 to 4, wherein the rod comprises an insulating sheath (210).

Example 6. The component according to example 5, wherein the insulating sheath (210) comprises at least one opening (212) enabling an electrical connection to be formed to the rod.

Example 7. The component according to any one of the preceding examples, further comprising a third and a fourth contact (115, 116), each contact being arranged circumferentially in the body and configured to be externally exposed and to reach an interior of the body.

Example 8. The component according to example 7, wherein the third and fourth contact are low-voltage terminals.

Example 9. The component according to example 8, wherein the third and fourth contacts are connected to the electromagnetic relay to control actuation of the electromagnetic relay.

Example 10. The component according to any one of the preceding examples, wherein electromagnetic relay is a multi-stage electromagnetic relay.

Example 11. The component according to any one of the preceding examples, wherein the multi-stage electromagnetic relay comprises a first spring (214) so that a first stage actuation of the relay requires a first actuation force and a second spring (302) so that a second stage actuation of the relay requires a second actuation force higher than the first actuation force.

Example 12. The component according to any one of the preceding examples, further comprising a pyro fuse (402)

configured to destructively break the connection element upon actuation of the pyro fuse.

Example 13. The component according to any one of the preceding examples, further comprising a fifth contact (304) arranged circumferentially in the body and configured to be externally exposed and to reach an interior of the body.

Example 14. The component according to any one of the preceding examples, wherein the body has a substantially cylindrical shape.

Example 15. The component according to any one of the preceding examples, wherein the body is tapered in a direction away from the cap.

Example 16. The component according to any one of the preceding examples, wherein at least one of the first and second contact area is threaded and configured to be threaded into a receiving socket.

Example 17. The component according to any one of the preceding examples, wherein further comprising a cap comprising a seal ring (120) configured to form a seal against a socket.

Example 18. A vehicle comprising a component according to any one of the preceding examples.

Example 19. A socket configured to receive a component according to any one of examples 1 to 17.

Example 20. A connector assembly comprising a component according to any one of examples 1 to 17 and a socket configured to receive the component.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A component for a high-voltage electric system of a vehicle, the component comprising:

a hollow body having a circular cross section;

a first contact arranged circumferentially in the body and configured to be externally exposed and to reach an interior of the body;

a second contact arranged circumferentially in the body and configured to be externally exposed and to reach an interior of the body, the second contact being separated from the first contact in the axial direction of the body;

an axially movable connector element arranged within the body; and an electromagnetic relay arranged to control axial movement of the connector element, wherein the relay is configured so that actuation of the relay results in an axial movement of the connector element to form an electrical connection between the first contact and the second contact, wherein the connector element comprises a rod, a first flange attached to the rod and arranged to form a connection with the first contact and a second flange attached to the rod and arranged to form a connection with the second contact upon actuation of the relay.

2. The component according to claim 1, wherein at least one of the first and second contact extends into the interior of the body.

3. The component according to claim 1, wherein at least one of the first and second contact comprises a central opening through which the connector element is arranged.

4. The component according to claim 1, wherein the rod comprises an insulating sheath.

5. The component according to claim 4, wherein the insulating sheath comprises at least one opening enabling an electrical connection to be formed to the rod.

6. The component according to claim 1, further comprising a third and a fourth contact, each contact being arranged circumferentially in the body and configured to be externally exposed and to reach an interior of the body.

7. The component according to claim 6, wherein the third and fourth contact are low-voltage terminals.

8. The component according to claim 7, wherein the third and fourth contacts are connected to the electromagnetic relay to control actuation of the electromagnetic relay.

9. The component according to claim 1, wherein electromagnetic relay is a multi- stage electromagnetic relay.

10. The component according to claim 1, wherein the electromagnetic relay comprises a first spring so that a first stage actuation of the relay requires a first actuation force and a second spring so that a second stage actuation of the relay requires a second actuation force higher than the first actuation force.

11. The component according to claim 1, further comprising a pyro fuse configured to destructively break the connection element upon actuation of the pyro fuse.

12. The component according to claim 1, further comprising a fifth contact arranged circumferentially in the body and configured to be externally exposed and to reach an interior of the body.

13. The component according to claim 1, wherein the body has a substantially cylindrical shape.

14. The component according to claim 1, wherein at least one of the first and second contact area is threaded and configured to be threaded into a receiving socket.

15. The component according to claim 1, wherein further comprising a cap comprising a seal ring configured to form a seal against a socket.

16. A vehicle comprising a component according to claim 1.

17. A socket configured to receive a component according to claim 1.

18. A connector assembly comprising a component according to claim 1 and a socket configured to receive the component.

* * * * *